United States Patent
Koshiji et al.

(10) Patent No.: US 11,575,731 B2
(45) Date of Patent: Feb. 7, 2023

(54) DATA TRANSMISSION METHOD, DATA TRANSMISSION APPARATUS AND PROGRAM

(71) Applicant: Nippon Telegraph and Telephone Corporation, Tokyo (JP)

(72) Inventors: Kojun Koshiji, Tokyo (JP); Naoki Higo, Tokyo (JP); Toshimitsu Tsubaki, Tokyo (JP); Masanao Nakano, Tokyo (JP); Tatsuya Ishihara, Tokyo (JP); Yoshiko Sueda, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 5 days.

(21) Appl. No.: 16/973,719

(22) PCT Filed: May 13, 2019

(86) PCT No.: PCT/JP2019/018852
§ 371 (c)(1),
(2) Date: Dec. 9, 2020

(87) PCT Pub. No.: WO2019/239759
PCT Pub. Date: Dec. 19, 2019

(65) Prior Publication Data
US 2021/0281630 A1    Sep. 9, 2021

(30) Foreign Application Priority Data
Jun. 11, 2018 (JP) .............................. JP2018-111116

(51) Int. Cl.
*H04L 67/06* (2022.01)
*H04L 67/56* (2022.01)
*H04L 67/561* (2022.01)

(52) U.S. Cl.
CPC .............. *H04L 67/06* (2013.01); *H04L 67/56* (2022.05); *H04L 67/561* (2022.05)

(58) Field of Classification Search
CPC ..... H04L 67/2804; H04L 67/06; H04L 67/28; H04L 67/56; H04L 67/561; G06F 16/00; G06F 16/90; G06F 16/906
See application file for complete search history.

(56) References Cited

U.S. PATENT DOCUMENTS 10,111,043 B1 * 10/2018 Cirit ........................ G08G 1/205
10,455,021 B2 * 10/2019 Collins ................. H04W 4/029
(Continued)

FOREIGN PATENT DOCUMENTS

| JP | 2013-195363 | 9/2013 |
| JP | 2014-128459 | 7/2014 |

(Continued)

OTHER PUBLICATIONS

Ono et al., "A Study of Picture Transfer Method for Moving Cameras over Networks," 2017 IEICE Communications Society Conference, Sep. 12, 2017, p. 5, 3 pages (with English Translation).

*Primary Examiner* — Caroline H Jahnige
(74) *Attorney, Agent, or Firm* — Fish & Richardson P.C.

(57) ABSTRACT

A data transmission apparatus causes a computer to receive first data and second data, each of which has a different transmission destination, evaluate relevance between the first data and the second data, and transmit the first data and the second data to the respective transmission destinations, and the transmitting of the data further includes transmitting the first data to the transmission destination of the second data in accordance with evaluation results obtained in the evaluating of the relation, so that a diversity of the data that can be collected by the transmission destination of the data is increased.

15 Claims, 6 Drawing Sheets

(56) References Cited

U.S. PATENT DOCUMENTS

| | | | |
|---|---|---|---|
| 2012/0101912 A1* | 4/2012 | Sen | G06Q 30/08 705/26.3 |
| 2012/0197852 A1* | 8/2012 | Dutta | H04L 67/12 707/E17.005 |
| 2013/0253878 A1 | 9/2013 | Sato et al. | |
| 2014/0258474 A1* | 9/2014 | Kim | H04W 4/70 709/219 |
| 2015/0032418 A1 | 1/2015 | Akiyama et al. | |
| 2017/0187696 A1* | 6/2017 | Ahuja | H04L 67/2809 |
| 2018/0300319 A1* | 10/2018 | Burriesci | G06F 16/783 |

FOREIGN PATENT DOCUMENTS

| | | |
|---|---|---|
| JP | 2015-001891 | 1/2015 |
| JP | 2015-26196 | 2/2015 |

\* cited by examiner

DATA TRANSMISSION METHOD, DATA TRANSMISSION APPARATUS AND PROGRAM

CROSS-REFERENCE TO RELATED APPLICATIONS

This application is a National Stage application under 35 U.S.C. § 371 of International Application No. PCT/JP2019/018852, having an International Filing Date of May 13, 2019, which claims priority to Japanese Application Serial No. 2018-111116, filed on Jun. 11, 2018. The disclosure of the prior application is considered part of the disclosure of this application, and is incorporated in its entirety into this application

TECHNICAL FIELD

The present disclosure relates to a data transmission method, a data transmission apparatus, and a program.

BACKGROUND ART

With the development of the Internet of Things (IoT), various devices can now be connected to a communication network to distribute data collected from the devices (hereinafter, referred to as "device data") to a communication network. Thereby, a large amount of device data is distributed to a communication network, and thus there is a problem with the occurrence of band pressure and load increase of communication networks.

In order to solve such problems, technology for eliminating information not required by a device data collector at an edge of a communication network and introducing only necessary information into the communication network managed by a carrier has been proposed (for example, Non Patent Literature 1).

CITATION LIST

Non Patent Literature

Non Patent Literature 1: Ono, Higo, Ishibashi, Asahara, and Takaya, "Study of image transfer scheme for mobile cameras through network", Shinsodai 2017, B-6-5, 2017.9.

SUMMARY OF THE INVENTION

Technical Problem

Machine learning and deep learning are examples of AI technology that utilizes device data. Machine learning is a technique for finding regularity and relation from a large amount of data and performing determination and prediction. Deep learning is a developed technique from machine learning. In deep learning, AI itself considers and determines the setting and combination of feature amounts, but a large amount of data is required to improve accuracy.

In recent years, applications utilizing such AI technology have become common. In a case where the technology described in Non-Patent Literature 1 or the like is applied to such an application, the possibility of device data that was considered unnecessary at first in the application becoming useful is conceivable. In this case, there is a possibility of a shortage in the types, range, or the like of device data to be analyzed for the application, which may affect analysis results.

In order to increase the accuracy of analysis or expand the range of analysis, it is necessary to set more various types of a wide range of data to be targets.

An advantage of some aspects of the present disclosure is to increase the diversity of data that can be collected by a transmission destination of data.

Means for Solving the Problem

In order to solve the above problems, a data transmission apparatus causes a computer to receive first data and second data, each of which has a different transmission destination, evaluate a relation between the first data and the second data, and transmit the first data and the second data to the respective transmission destinations, in which the transmitting of the data further includes transmitting the first data to the transmission destination of the second data in accordance with evaluation results obtained in the evaluating of the relation.

Effects of the Invention

It is possible to increase the diversity of data that can be collected by a transmission destination of data.

DESCRIPTION OF EMBODIMENTS

Figure 1:
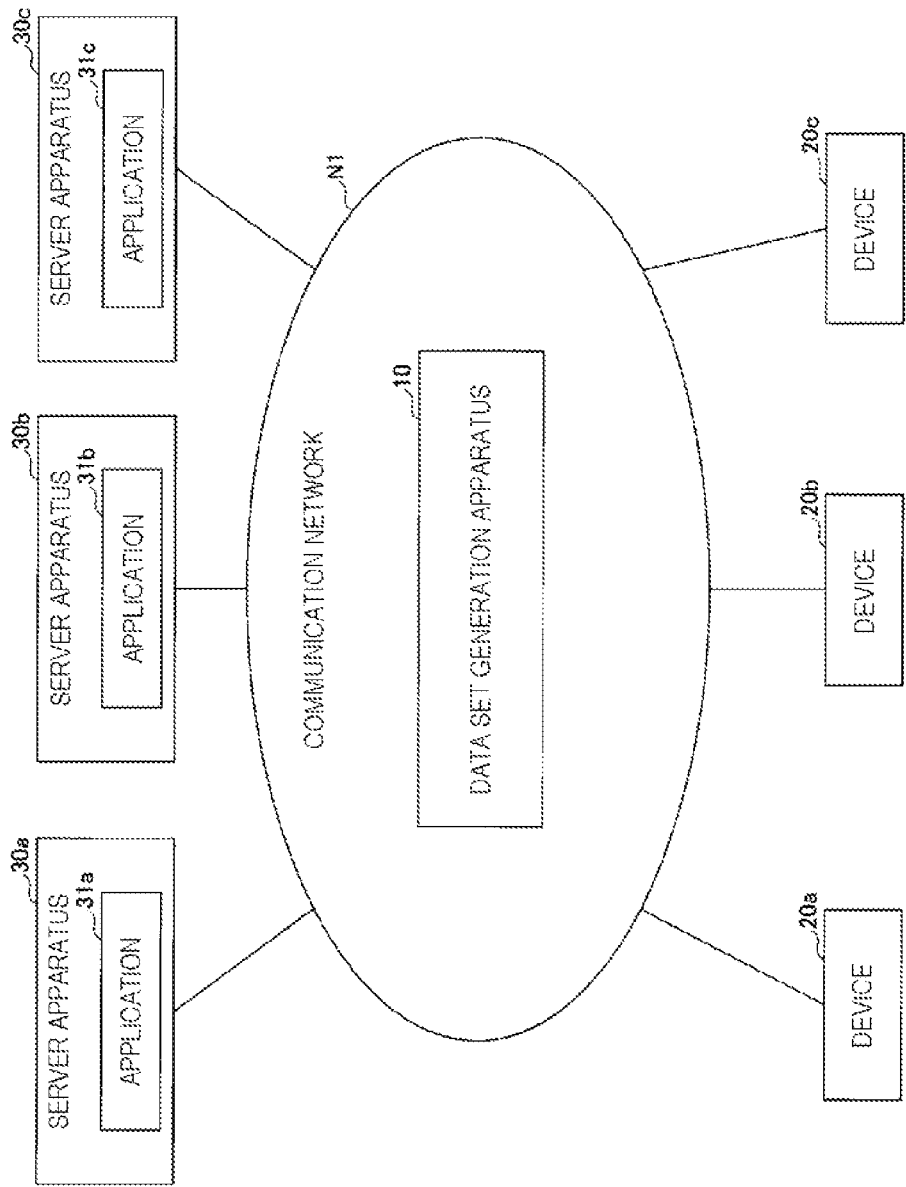
FIG. 1 is a diagram illustrating an example of a system configuration in an embodiment of the present disclosure.

Hereinafter, an embodiment of the present disclosure will be described with reference to the drawings. FIG. 1 is a diagram illustrating an example of a system configuration in an embodiment of the present disclosure. In FIG. 1, a plurality of devices such as a device 20a, a device 20b, and a device 20c (hereinafter, simply referred to as a "device 20" in a case where these devices are not distinguished from each other) and a plurality of server apparatuses such as a server apparatus 30a, a server apparatus 30b, and a server apparatus 30c (hereinafter, simply referred to as a "server apparatus 30" in a case where these apparatuses are not distinguished from each other) are connected to a communication network N1. Each of the server apparatuses 30 respectively includes an application 31a, an application 31b, or an application 31c (hereinafter, simply referred to as an "application 31" in a case where these applications are not distinguished from each other).

The device 20 is equipment or an apparatus that generates data (hereinafter referred to as "device data") and transmits the device data to an application 31 determined in advance. For example, an Internet of Things (IoT) device or a communication terminal such as a smartphone may be used as the device 20.

The applications 31 of the server apparatuses 30 are software that provides services utilizing AI technology such as machine learning or deep learning, for device data transmitted from the devices 20 and are provided by, for example, a service provider. Each of the server apparatuses 30 may be configured as a cloud system. Meanwhile, in the present embodiment, the application 31a collects data of the device 20a, the application 31b collects data of the device 20b, and the application 31c collects data of the device 20c. That is, a transmission destination of device data transmitted from each of the devices 20 is different. However, a relationship between the application 31 and the device 20 is not limited to a one-to-one relationship. Any one of many-to-one, one-to-many, and many-to-many may be used.

The communication network N1 is a network that supports, for example, a TCP/IP protocol stack and transfers device data transmitted from each of the devices 20 to each of the applications 31.

In FIG. 1, the communication network N1 includes a data set generation apparatus 10. The data set generation apparatus 10 receives device data transmitted from each of the devices 20. The data set generation apparatus 10 is a computer that transmits device data which is highly related to newly received device data, among device data received in the past, to an application 31 (server apparatus 30) which is a collector (transmission destination) of the newly received device data, together with the newly received device data. As a result, the application 31 can perform machine learning, deep learning, or the like on the basis of device data which is highly related to the device data in addition to device data scheduled to be collected. Meanwhile, a computer in which a virtualized router (implemented by software) is implemented, a computer in a data center, or the like may be used to realize the data set generation apparatus 10.

Meanwhile, each of the devices 20 may transmit device data to the data set generation apparatus 10 rather than an application 31 which is a collector of device data from the device 20 so that device data can be received by the data set generation apparatus 10. In this case, the data set generation apparatus 10 may manage correspondence information between each of the devices 20 (or the type of device data) and each of the applications 31 and specify an application 31 (server apparatus 30) which is a transmission destination of received device data on the basis of the correspondence information. Alternatively, each of the devices 20 may transmit device data to the application 31 which is a collector, and the data set generation apparatus 10 may acquire a reproduction of device data from the communication network N1 using packet capture or the like.

Figure 2:
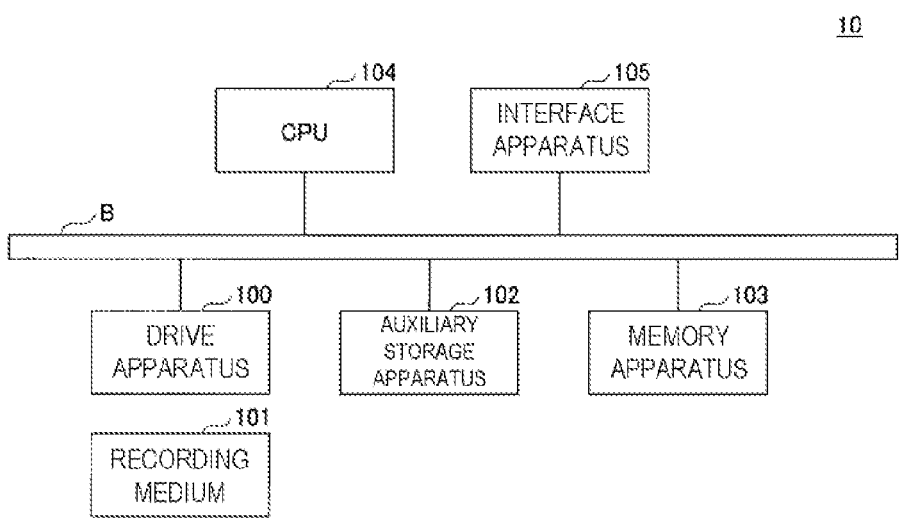
FIG. 2 is a diagram illustrating an example of a hardware configuration of a data set generation apparatus 10 in the embodiment of the present disclosure.

FIG. 2 is a diagram illustrating an example of a hardware configuration of the data set generation apparatus 10 in the embodiment of the present disclosure. The data set generation apparatus 10 in FIG. 2 includes a drive apparatus 100, an auxiliary storage apparatus 102, a memory apparatus 103, a CPU 104, an interface apparatus 105, and the like which are connected to each other through a bus B.

A program for implementing processing in the data set generation apparatus 10 is provided by a recording medium 101 such as a CD-ROM. When the recording medium 101 storing a program is set in the drive apparatus 100, the program is installed in the auxiliary storage apparatus 102 from the recording medium 101 through the drive apparatus 100. However, the program is not necessarily installed from the recording medium 101 and may be downloaded from another computer through a network. The auxiliary storage apparatus 102 stores the installed program and stores necessary files, data, and the like.

The memory apparatus 103 reads a program from the auxiliary storage apparatus 102 in a case where an instruction for starting up the program has been given, and stores the program. The CPU 104 executes a function related to the data set generation apparatus 10 in accordance with a program stored in the memory apparatus 103. The interface apparatus 105 is used as an interface for connection to a network.

Figure 3:
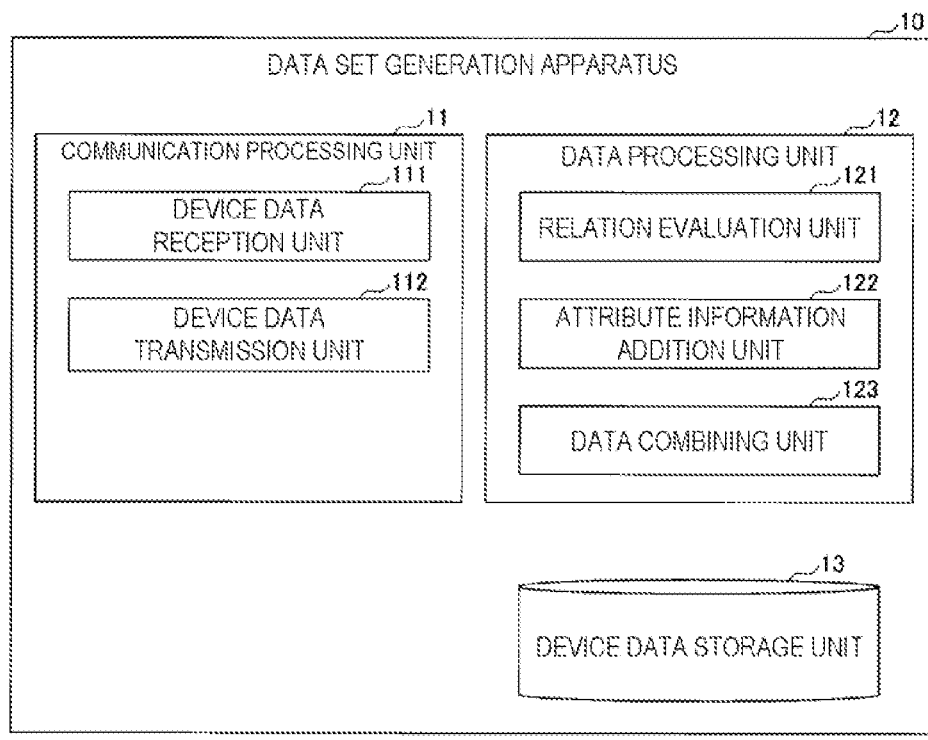
FIG. 3 is a diagram illustrating an example of a functional configuration of the data set generation apparatus 10 in the embodiment of the present disclosure.

FIG. 3 is a diagram illustrating an example of a functional configuration of the data set generation apparatus 10 in the embodiment of the present disclosure. In FIG. 3, the data set generation apparatus 10 includes a communication processing unit 11, a data processing unit 12, and the like. These units are realized by processing for causing the CPU 104 to execute one or more programs installed in the data set generation apparatus 10. The data set generation apparatus 10 also uses a device data storage unit 13. The device data storage unit 13 can be realized using, for example, the auxiliary storage apparatus 102, a storage apparatus that can be connected to the data set generation apparatus 10 through a network, or the like.

The communication processing unit 11 performs processing related to communication (transfer) of device data. In FIG. 3, the communication processing unit 11 includes a device data reception unit 111 and a device data transmission unit 112. The device data reception unit 111 receives device data. The device data transmission unit 112 transmits device data to an application 31 which is a collector of the device data.

The data processing unit 12 performs processing related to device data. In FIG. 3, the data processing unit 12 includes a relation evaluation unit 121, an attribute information addition unit 122, and a data combining unit 123.

The relation evaluation unit 121 evaluates relevance between device data received by the device data reception unit 111 (hereinafter referred to as "received data") and device data received in the past and stored in the device data storage unit 13 (hereinafter referred to as "accumulated data").

The attribute information addition unit 122 adds geographical attribute information to received data when the received data has no geographical attribute information imparted to the received data. The geographical attribute information is, for example, information indicating a location (position) where the received data is collected. In addition, the attribute information addition unit 122 adds temporal attribute information to received data when the received data has no temporal attribute information imparted to the received data. The temporal attribute information is information indicating the time (date and time, or the like) when the received data is collected or received. Thus, the received data having attribute information is stored in the device data storage unit 13. Meanwhile, in the above description of addition of attribute information, two pieces of information of geographical attribute information and temporal attribute information have been described as attribute information. However, any one of the geographical attribute information and the temporal attribute information may be added, or attribute information other than the geographical attribute information and the temporal attribute information may be added. Meanwhile, attribute information added to received data by the attribute information addition unit 122 is used as attribute information for which relevance between received data and accumulated data are to be evaluated (evaluation target attribute information).

The data combining unit 123 combines received data with accumulated data evaluated (determined) to be related to the received data. In a case where received data is combined with any accumulated data, the accumulated data is also transmitted to an application 31 which is a collector (transmission destination) of the received data together with the received data. That is, the device data transmission unit 112 transmits the accumulated data to a collector (transmission destination) of the received data in accordance with evaluation results of relevance between the received data and the accumulated data.

Meanwhile, accumulated data combined with received data may or may not be limited to accumulated data collected from the device 20 which is managed by the same user as the user of the device 20 which is the transmission source of the received data.

Meanwhile, the units constituting the data processing unit 12 may not necessarily be implemented in the same computer (node), and may be distributed to a plurality of computers (nodes).

Figure 4:
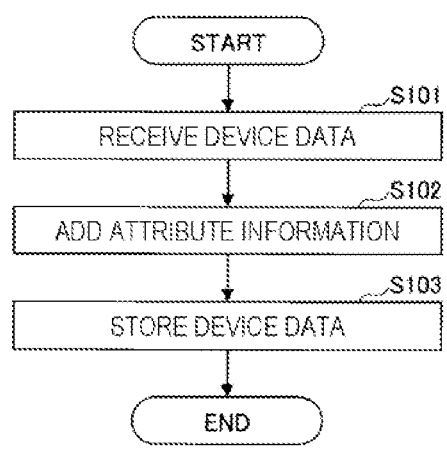
FIG. 4 is a flowchart illustrating an example of a processing procedure executed by the data set generation apparatus 10 in response to the reception of device data.

Hereinafter, a processing procedure executed by the data set generation apparatus 10 will be described. FIG. 4 is a flowchart illustrating an example of a processing procedure executed by the data set generation apparatus 10 in response to the reception of device data.

When the device data reception unit 111 receives device data (received data) (S101), the attribute information addition unit 122 adds attribute information indicating a location, a date and time, and the like of collection of the received data to the received data (S102). For example, in the case of a location, the attribute information addition unit 122 may inquire about an area covered by a network apparatus (for example, a base station or the like) containing the device 20 from the network apparatus, and may add information indicating the area to received data as location information. In addition, when there is a network apparatus that ascertains the position of the device 20, the attribute information addition unit 122 may inquire about positional information thereof from the network apparatus and may add the positional information to received data as location information. In addition, a date and time received by the device data reception unit 111 may be adopted for the date and time. However, in a case where such attribute information is included in received data (for example, a case where such attribute information is added to received data by the device 20, or the like), attribute information may not be added to the received data.

Subsequently, the attribute information addition unit 122 stores the received data in the device data storage unit 13 (S103). Accordingly, device data including attribute information is accumulated in the device data storage unit 13.

Figure 5:
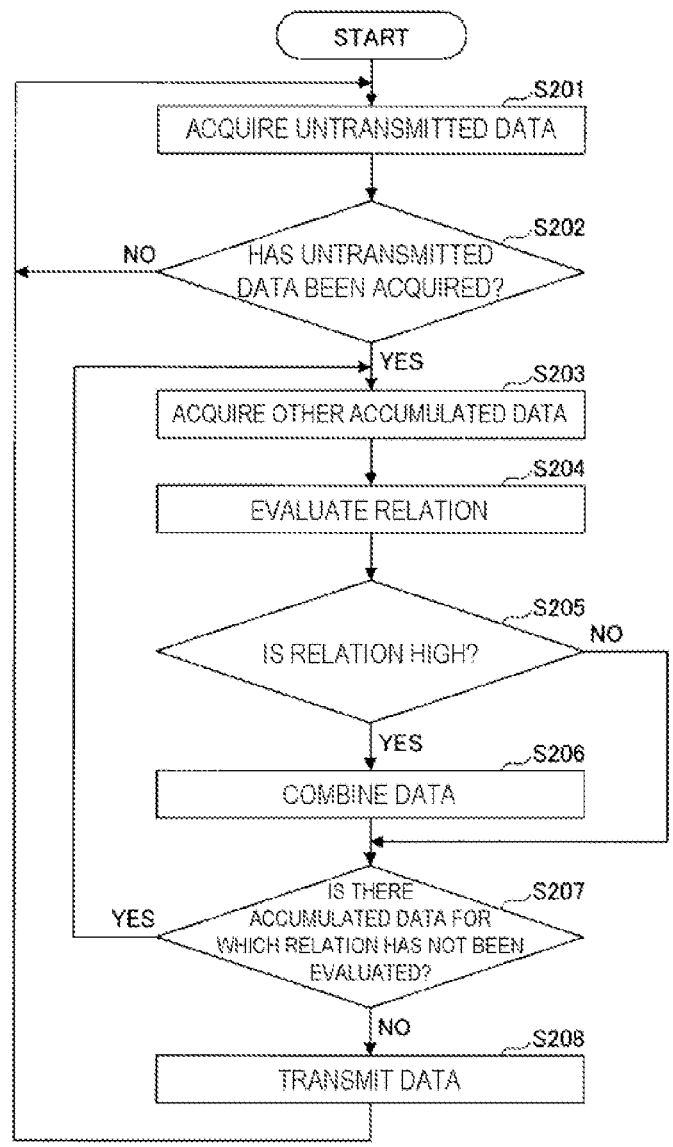
FIG. 5 is a flowchart illustrating an example of a processing procedure of transmission processing for device data.

FIG. 5 is a flowchart illustrating an example of a processing procedure of transmission processing for device data. The processing procedure in FIG. 5 may be executed asynchronously with the processing procedure in FIG. 4, or may be executed synchronously (for example, subsequently to step S102). Here, an example in which the processing procedure is executed asynchronously will be described.

In step S201, the relation evaluation unit 121 acquires one piece of untransmitted device data (hereinafter referred to as "untransmitted data") from the device data storage unit 13. Here, "untransmitted data" refers to device data which has not been transmitted (transferred) to an application 31 which is a collector of the untransmitted data by the data set generation apparatus 10. Meanwhile, in a case where the processing procedure in FIG. 5 is executed synchronously with the processing procedure in FIG. 4, received data is untransmitted data.

In a case where there is no untransmitted data (NO in S202), step S201 and the subsequent steps are executed after a fixed period has elapsed. In a case where untransmitted data has been acquired (YES in S202), the relation evaluation unit 121 acquires accumulated data, which is accumulated data other than the untransmitted data and for which relevance with the untransmitted data have not been evaluated (hereinafter referred to as "target accumulated data") from the device data storage unit 13 (S203).

Subsequently, the relation evaluation unit 121 evaluates relevance between the untransmitted data and the target accumulated data (S204). As an example of a method of evaluating relevance, three evaluation methods of a method a to a method c are shown below.

Method a

For each item (a location, a date and time) of attribute information, the range of degree of relation (a maximum value and a minimum value) and a level for dividing the range (that is, the level of an evaluation value of relation) are determined. For example, in the case of a location, a distance between the devices 20 farthest from each other, among all of the devices 20 for which device data is to be collected, is set to be a minimum value of the range of degree of relation, and a distance between the devices 20 closest to each other is set to be a maximum value of that range. In a case where the degree of relation is evaluated in 10 levels, a range between the maximum value and the minimum value is equally divided into 10 parts. The ranges obtained by the division will be referred to as "divided ranges" below. Evaluation values of 10, 9, 8, . . . , 2, and 1 are allocated in order from the divided range in which a distance between the devices is short. The relation evaluation unit 121 obtains a difference (distance) between the location of untransmitted data and the location of target accumulated data and sets an evaluation value corresponding to a divided range to which the difference (distance) belongs to be an evaluation value related to the location of the untransmitted data and the location of the target accumulated data.

An evaluation value can be similarly obtained for a date and time. For example, the range of degree of relation is set to be the past 24 hours, a period of time of 24 hours is equally divided into 10 parts, and evaluation values of 10, 9, 8, . . . , 2, and 1 are allocated to each divided range in order from the most recent. The relation evaluation unit 121 obtains a difference between a date and time of untransmitted data and a date and time of target accumulated data, and sets an evaluation value corresponding to a divided range to which the difference belongs to be an evaluation value related to the time of the untransmitted data and the time of the target accumulated data. Meanwhile, in a case where the difference exceeds 24 hours, the evaluation value may be set to 0.

The relation evaluation unit 121 sets a total value of an evaluation value of a location and an evaluation value of a date and time to be an evaluation value of a relation between untransmitted data and target accumulated data. Meanwhile, in a case where there are other items of attribute information, an evaluation value may be similarly obtained for the other items.

Method b

The relation evaluation unit 121 classifies the set of accumulated data excluding the untransmitted data into a plurality of subsets (a plurality of classes) by, for example, a clustering technique that uses attribute information (a combination of values of each item that constitute the attribute information). An AI technique such as machine learning or deep learning may be applied to the classification. The relation evaluation unit 121 obtains a degree of correspondence with each subset (a probability value classified into each subset) (for example, a value indicating a probability of 0 to 1, or the like) for untransmitted data, and sets the degree of correspondence with a subset to which target accumulated data belongs to be an evaluation value of a relation between the untransmitted data and the target accumulated data.

Method c

The relation evaluation unit 121 extracts each of includes a set (including untransmitted data) of accumulated data transmitted from the same device 20 as untransmitted data and a set (also including target accumulated data) of accumulated data transmitted from the same device 20 as target accumulated data from the device data storage unit 13 to obtain a correlation coefficient for the two sets, and sets the correlation coefficient to be an evaluation value. A variable to be calculated for the correlation coefficient may be attribute information or a value of device data. The value of the device data is, for example, a numerical value indicating the temperature when the device data is device data of the device 20 that measures the temperature.

Subsequently, the relation evaluation unit 121 determines whether or not a relation between target accumulated data and received data is high (or whether being related or not) (S205). An example of a method of determining the degree of relation (whether being related or not) will be described below for each relation evaluation method.

Case of Method a

A threshold value for an evaluation value of a relation is determined. In a case where an evaluation value of a relation between untransmitted data and target accumulated data exceeds a threshold value, it is determined that the relation is high (related). Otherwise, it is determined that the relation is low (not related).

Case of Method b

In a case where an evaluation value of a relation between untransmitted data and target accumulated data is a maximum value, among the degrees of correspondence which are obtained for each subset of untransmitted data, it is determined that the relation therebetween is high (related), and otherwise, it is determined that the relation therebetween is low (not related).

Case of Method c

A threshold value for an evaluation value of relation (correlation coefficient) is determined. In a case where an evaluation value of a relation between untransmitted data and target accumulated data exceeds the threshold value, it is determined that the relation therebetween is high (related), and otherwise, it is determined that the relation therebetween is low (not related).

In a case where it is determined that the relation between untransmitted data and target accumulated data is high (the untransmitted data and the target accumulated data are related to each other) (YES in S205), the data combining unit 123 combines (associates) the target accumulated data with the untransmitted data to generate a data set for the untransmitted data (S206). On the other hand, in a case where it is determined that the relation between untransmitted data and target accumulated data is low (there is no relation between the untransmitted data and the target accumulated data) (NO in S205), the target accumulated data is not combined (associated) with the untransmitted data.

Subsequently, the relation evaluation unit 121 determines whether or not there is accumulated data for which a relation with untransmitted data has not been evaluated (S207). In a case where there is applicable accumulated data (YES in S207), one of the pieces of applicable accumulated data is set to be target accumulated data (S203), and step S204 and the subsequent steps are executed. In this case, when it is determined that the relation with untransmitted data is high (related to untransmitted data) with respect to new target accumulated data (YES in S205), the new target accumulated data constitutes a data set together with the untransmitted data (S206). That is, there is a possibility that one or a plurality of pieces of accumulated data will be associated with one piece of untransmitted data.

On the other hand, in a case where there is no accumulated data applicable to the determination in step S207 (NO in S207), the device data transmission unit 112 transmits untransmitted data to an application 31 (server apparatus 30) which is a collector of untransmitted data (S208). At this time, when other accumulated data is combined with untransmitted data, a set of data (data set) of the untransmitted data and the other accumulated data is transmitted to the application 31 (server apparatus 30). Meanwhile, the other accumulated data which is combined with the untransmitted data may be transmitted to the application 31 which is a collector of untransmitted data at a timing different from that of the untransmitted data. However, the untransmitted data and the other accumulated data are combined with each other and transmitted, so that the application 31 which is a collector can easily recognize that the untransmitted data and the other accumulated data are related to each other and can be used for analysis processing of device data, and the like.

Subsequently, step S201 and the subsequent steps are executed. In other words, when other untransmitted data is stored in the device data storage unit 13, step S203 and the subsequent steps are executed for the other untransmitted data. Meanwhile, in order to make it possible to determine whether or not each of the pieces of accumulated data has been transmitted to a collector of the accumulated data, a completed-transmission flag is associated with untransmitted data and stored in the device data storage unit 13 in S208.

Figure 6:
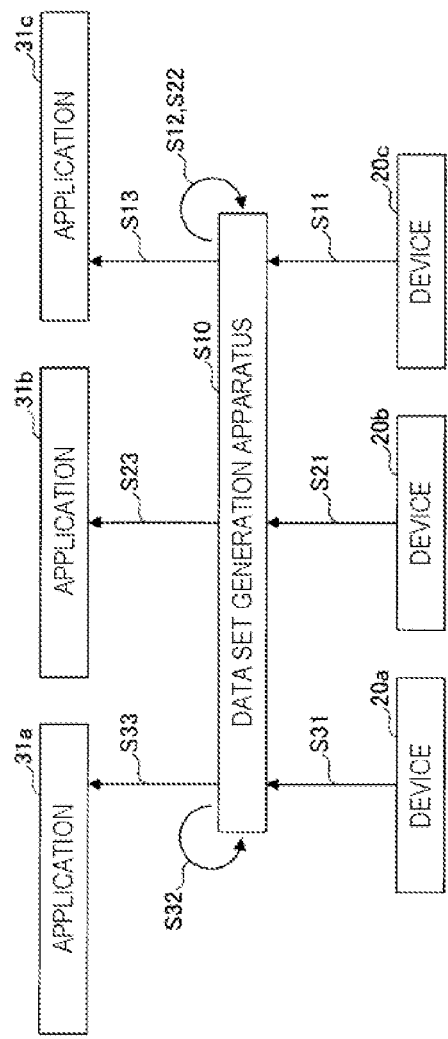
FIG. 6 is a diagram illustrating a specific example of processing executed by the data set generation apparatus 10 in the system configuration in the present embodiment.

FIG. 6 is a diagram illustrating a specific example of processing executed by the data set generation apparatus 10 in a system configuration of the present embodiment.

In FIG. 6, first, device data transmitted from the device 20c (hereinafter referred to as "device data c") is received in the data set generation apparatus 10 (S11). The processing in FIG. 4 is executed with the device data c as received data, and the processing in FIG. 5 is executed with the device data c as untransmitted data (S12). Here, it is assumed that there is no accumulated data highly related to the device data c. Accordingly, the data set generation apparatus 10 transmits only the device data c to the application 31c which is a collector of the device data c (S13).

Subsequently, device data transmitted from the device 20b (hereinafter referred to as "device data b") is received in the data set generation apparatus 10 (S21). The processing in FIG. 4 is executed with the device data b as received data, and the processing in FIG. 5 is executed with the device data b as untransmitted data (S22). Here, it is assumed that there is no accumulated data highly related to the device data b. Accordingly, the data set generation apparatus 10 transmits only the device data b to the application 31b which is a collector of the device data b (S23).

Subsequently, device data transmitted from the device 20a (hereinafter referred to as "device data a") is received in the data set generation apparatus 10 (S31). The processing in FIG. 4 is executed with the device data a as received data, and the processing in FIG. 5 is executed with the device data a as untransmitted data (S32). Here, it is assumed that the device data b has been determined to be highly related to the device data a. Accordingly, the data set generation apparatus 10 transmits a data set including the device data a and the device data b to the application 31a which is a collector of the device data a (S33).

As described above, according to the present embodiment, a relation of device data transmitted from each of various devices 20 is evaluated, and data which is highly related to other device data is transmitted not only to a collector (transmission destination) of the other device data, but also to a collector (transmission destination) of device data which is highly related to the other device data. Accordingly, it is possible to increase the diversity of data that can be collected by a transmission destination of data. As a result, for example, the applications 31 can set a broader range of data to be an object to be learned, and thus it is possible to increase the accuracy of analysis.

Meanwhile, in the present embodiment, the data set generation apparatus 10 is an example of a data transmission apparatus. The device data reception unit 111 is an example of a reception unit. The relation evaluation unit 121 is an example of an evaluation unit. The device data transmission unit 112 is an example of a transmission unit. The attribute information addition unit 122 is an example of an addition unit.

While an embodiment of the present disclosure has been described above, the present disclosure is not limited to the specific embodiment and can be subjected to various modifications and changes within the scope of the gist of the present disclosure disclosed in the claims.

REFERENCE SIGNS LIST

10 Data set generation apparatus
11 Communication processing unit
12 Data processing unit
13 Device data storage unit
20a, 20b, 20c device
30a, 30b, 30c Server apparatus
31a, 31b, 31c Application
100 Drive apparatus
101 Recording medium
102 Auxiliary storage apparatus
103 Memory apparatus
104 CPU
105 Interface apparatus
111 Device data reception unit
112 Device data transmission unit
121 Relation evaluation unit
122 attribute information addition unit
123 Data combining unit
B bus

The invention claimed is:

1. A data transmission method comprising:
causing a computer to:
receive first data from a first device having a first transmission destination;
determine that there is no accumulated data related to the first data;
transmit the first data to the first transmission destination;
receive second data from a second device having a second transmission destination, wherein the second transmission destination is different from the first transmission destination, wherein correspondence relationships i) between the first device and the first transmission destination and ii) between the second device and the second transmission destination are determined in advance;
upon receiving the second data from the second device, evaluate a relation between the first data and the second data to obtain evaluation results that indicate that the first data and the second data are related, wherein evaluating the relation between the first data and second data comprises:
determining a range for an attribute of the first data and the second data, based on a maximum value and a minimum value of the attribute for a plurality of data collected by a plurality of devices,
equally dividing the range for the attribute into a predetermined number of divided ranges,
determining a distance of the attribute between the first data and the second data, and
determining a divided range to which the distance belongs to as the relation between the first data and the second data; and
transmit the first data together with the second data to the second transmission destination of the second data in accordance with the evaluation results obtained in the evaluating of the relation.

2. The data transmission method according to claim 1, wherein
at least one of geographical attribute information and temporal attribute information is set to be evaluation target attribute information,
the method further includes causing the computer to add the evaluation target attribute information to the first data and the second data when the first data and the second data are data to which the evaluation target attribute information has not been imparted, and
the evaluating of the relation includes evaluating the relation on a basis of the evaluation target attribute information of the first data and the evaluation target attribute information of the second data.

3. The data transmission method according to claim 1, wherein the evaluating of the relation includes obtaining a distance between attribute information of the first data and attribute information of the second data with respect to identical attribute information and obtaining a sum of obtained distances when there are a plurality of pieces of attribute information.

4. The data transmission method according to claim 1, wherein the evaluating of the relation includes classifying the first data into classes by a clustering method using attribute information, obtaining a value of a probability of the second data being classified into classes, and determining that the relation is high when the first data is classified into a class having a maximum probability value.

5. The data transmission method according to claim 1, wherein the evaluating of the relation includes obtaining a correlation coefficient between a data set having an identical transmission source to the first data and a data set having an identical transmission source to the second data.

6. A data transmission apparatus comprising one or more processors configured to:

receive first data from a first device having a first transmission destination;
determine that there is no accumulated data related to the first data;
transmit the first data to the first transmission destination;
receive second data from a second device having a second transmission destination, wherein the second transmission destination is different from the first transmission destination, wherein correspondence relationships i) between the first device and the first transmission destination and ii) between the second device and the second transmission destination are determined in advance;
upon receiving the second data from the second device, evaluate a relation between the first data and the second data to obtain evaluation results that indicate that the first data and the second data are related, wherein evaluating the relation between the first data and second data comprises:
determining a range for an attribute of the first data and the second data, based on a maximum value and a minimum value of the attribute for a plurality of data collected by a plurality of devices,
equally dividing the range for the attribute into a predetermined number of divided ranges,
determining a distance of the attribute between the first data and the second data, and
determining a divided range to which the distance belongs to as the relation between the first data and the second data; and
transmit the first data together with the second data to the second transmission destination of the second data in accordance with the evaluation results obtained in the evaluating of the relation.

7. The data transmission apparatus according to claim 6, wherein
at least one of geographical attribute information and temporal attribute information is set to be evaluation target attribute information,
the one or more processors are further configured to add the evaluation target attribute information to the first data and the second data when the first data and the second data are data to which the evaluation target attribute information has not been imparted, and
the evaluating of the relation includes evaluating the relation on a basis of the evaluation target attribute information of the first data and the evaluation target attribute information of the second data.

8. The data transmission apparatus according to claim 6, wherein the evaluating of the relation includes obtaining a distance between attribute information of the first data and attribute information of the second data with respect to identical attribute information and obtaining a sum of obtained distances when there are a plurality of pieces of attribute information.

9. The data transmission apparatus according to claim 6, wherein the evaluating of the relation includes classifying the first data into classes by a clustering method using attribute information, obtaining a value of a probability of the second data being classified into classes, and determining that the relation is high when the first data is classified into a class having a maximum probability value.

10. The data transmission apparatus according to claim 6, wherein the evaluating of the relation includes obtaining a correlation coefficient between a data set having an identical transmission source to the first data and a data set having an identical transmission source to the second data.

11. A non-transitory computer readable medium storing one or more instructions causing a computer to:
receive first data from a first device having a first transmission destination;
determine that there is no accumulated data related to the first data;
transmit the first data to the first transmission destination;
receive second data from a second device having a second transmission destination, wherein the second transmission destination is different from the first transmission destination, wherein correspondence relationships i) between the first device and the first transmission destination and ii) between the second device and the second transmission destination are determined in advance;
upon receiving the second data from the second device, evaluate a relation between the first data and the second data to obtain evaluation results that indicate that the first data and the second data are related, wherein evaluating the relation between the first data and second data comprises:
determining a range for an attribute of the first data and the second data, based on a maximum value and a minimum value of the attribute for a plurality of data collected by a plurality of devices,
equally dividing the range for the attribute into a predetermined number of divided ranges,
determining a distance of the attribute between the first data and the second data, and
determining a divided range to which the distance belongs to as the relation between the first data and the second data; and
transmit the first data together with the second data to the second transmission destination of the second data in accordance with the evaluation results obtained in the evaluating of the relation.

12. The non-transitory computer readable medium according to claim 11, wherein
at least one of geographical attribute information and temporal attribute information is set to be evaluation target attribute information,
the one or more instructions further cause the computer to add the evaluation target attribute information to the first data and the second data when the first data and the second data are data to which the evaluation target attribute information has not been imparted, and
the evaluating of the relation includes evaluating the relation on a basis of the evaluation target attribute information of the first data and the evaluation target attribute information of the second data.

13. The non-transitory computer readable medium according to claim 11, wherein the evaluating of the relation includes obtaining a distance between attribute information of the first data and attribute information of the second data with respect to identical attribute information and obtaining a sum of obtained distances when there are a plurality of pieces of attribute information.

14. The non-transitory computer readable medium according to claim 11, wherein the evaluating of the relation includes classifying the first data into classes by a clustering method using attribute information, obtaining a value of a probability of the second data being classified into classes, and determining that the relation is high when the first data is classified into a class having a maximum probability value.

15. The non-transitory computer readable medium according to claim 11, wherein the evaluating of the relation includes obtaining a correlation coefficient between a data set having an identical transmission source to the first data and a data set having an identical transmission source to the second data.

\* \* \* \* \*